(12) United States Patent
Kameyama (10) Patent No.: US 8,881,689 B2
(45) Date of Patent: Nov. 11, 2014

(54) EXHAUST ADAPTER AND COMBUSTION APPARATUS HAVING THE SAME

(75) Inventor: Shuji Kameyama, Hyogo (JP)

(73) Assignee: Noritz Corporation, Hyogo (JP)

(*) Notice: Subject to any disclaimer, the term of this patent is extended or adjusted under 35 U.S.C. 154(b) by 239 days.

(21) Appl. No.: 13/456,923

(22) Filed: Apr. 26, 2012

(65) Prior Publication Data

US 2012/0272928 A1 Nov. 1, 2012

(30) Foreign Application Priority Data

Apr. 26, 2011 (JP) .................................. 2011-098571

(51) Int. Cl.
*F23J 13/04* (2006.01)
*F24H 9/02* (2006.01)
*F24H 1/28* (2006.01)

(52) U.S. Cl.
CPC ... *F24H 1/28* (2013.01); *F24H 9/02* (2013.01)
USPC ...................... 122/19.2; 126/307 R (58) Field of Classification Search
CPC . F01N 13/00; F01N 2013/00; F01N 2340/00; F01N 2450/10; F01N 2470/24; F01N 2450/40; F01N 13/1827; F24H 9/0031; F23J 13/00
USPC .......... 122/19.2; 126/307, 312; 285/401, 402, 285/424
See application file for complete search history.

(56) References Cited

U.S. PATENT DOCUMENTS

| | | | | |
|---|---|---|---|---|
| 5,016,613 | A * | 5/1991 | Maitland | 126/312 |
| 5,680,856 | A * | 10/1997 | van Dijk | 126/85 B |
| 6,029,655 | A * | 2/2000 | Hussong et al. | 126/515 |
| 6,401,709 | B1 * | 6/2002 | Okamoto et al. | 126/299 D |
| 6,634,352 | B2 * | 10/2003 | Maiello | 126/307 R |
| 8,672,367 | B2 * | 3/2014 | Jacklich et al. | 285/402 |
| 2010/0000513 | A1 * | 1/2010 | LaMunyon, III | 126/312 |
| 2011/0005227 | A1 * | 1/2011 | Toi et al. | 60/670 |
| 2013/0062878 | A1 * | 3/2013 | Nakayama et al. | 285/124.1 |

FOREIGN PATENT DOCUMENTS

JP  55-080645 U1  6/1980
JP  2000-291939 A  10/2000

* cited by examiner

*Primary Examiner* — Gregory A Wilson
(74) *Attorney, Agent, or Firm* — Rader, Fishman & Grauer PLLC (57) ABSTRACT

An exhaust adapter A having an inner tubular wall 41 forming a through hole 40 communicating with an exhaust port 14, an outer tubular wall 42 surrounding the inner tubular wall 41, and an annular concave part 43 formed between the inner tubular wall 41 and the outer tubular wall 42. One of at least two types of exhaust pipes having different pipe diameters can be selectively connected as an exhaust pipe 2 by utilizing either the through hole 40 or the annular concavity 43. Height H1 of the inner tubular wall 41 is designed to be lower than height H2 of the outer tubular wall 42. Drain flowing in the annular concave part 43 is prevented from flowing out around the outer tubular wall 42 and furthermore the exhaust adapter A can be accurately used for various types of exhaust pipes with different pipe diameters.

11 Claims, 6 Drawing Sheets

COMBUSTION GAS

EXHAUST ADAPTER AND COMBUSTION APPARATUS HAVING THE SAME

BACKGROUND OF THE INVENTION

1. Field of the Invention

The present invention relates to an exhaust adapter of a combustion apparatus having a burner, the exhaust adapter being used for connecting an exhaust pipe leading exhaust gas (combustion gas) to a desirable place to be discharged with an exhaust port of the combustion apparatus, and also relates to a combustion apparatus provided with the exhaust adapter.

2. Description of the Related Art

For example, a combustion apparatus of inside installation type generally adopts a means for leading combustion gas outside utilizing an exhaust pipe as a discharge means of combustion gas. In this case, an exhaust port for combustion gas is provided on an upper part of the combustion apparatus and the exhaust pipe is attached so as to rise upward from the exhaust port (for example, refer to Japanese examined Utility Model publication No. JP-55-80645-U1). One example of an attachment means of an exhaust pipe is that an exhaust adapter is attached to a member having an exhaust port and the exhaust pipe is fitted and coupled at the upper part of the exhaust adapter (for example, refer to Japanese unexamined Patent publication No. JP-2000-291939-A).

However, the above-mentioned conventional arts have the following problems to be solved.

In order to connect an exhaust pipe to an exhaust port of a combustion apparatus, one of two types of exhaust pipes with different pipe diameters is sometimes selected and used. Specific examples are as follows. Namely, the component cost is reduced when the diameter of the exhaust pipe becomes smaller. Therefore, it is desirable that an exhaust pipe with smaller diameter of two types of exhaust pipes with different pipe diameters is used as a standard one for general use. However, when the total length of the exhaust pipe considerably increases, the exhaust resistance becomes large, so that an exhaust pipe with large diameter is desirable in view of reducing the exhaust resistance as much as possible. Sometimes two types of exhaust pipes with different pipe diameters are selectively used based on different circumstances when the exhaust pipe is used.

In contrast, a conventional exhaust adapter has been designed to be connected with only one type of exhaust pipe. In such a case, two types of exhaust adapters are required to be prepared and to be used depending on the diameter of the exhaust pipe in order to selectively use two types of exhaust pipes with different pipe diameters. Such a selective use of the exhaust adapters is bothersome and inconvenient. Furthermore, preparation of two types of exhaust adapters costs much. Therefore, it is desired to solve such defects.

On the other hand, when combustion gas decreases in temperature while passing through the exhaust pipe and water vapor contained in the combustion gas condenses, highly acidic drain (condensate water) may be generated. When such drain flows outside of the exhaust adapter, there causes a problem that the outer surface of the combustion apparatus is contaminated by the drain. Therefore, it is desired not to have such a defect that the outer surface of the combustion apparatus is contaminated by the drain when the exhaust adapter is designed to be preferably used for two types of exhaust pipes with different pipe diameters.

SUMMARY OF THE INVENTION

The present invention has an object to provide an exhaust adapter which can inhibit or eliminate the above-mentioned defects and to provide a combustion apparatus having the exhaust adapter.

The present invention takes the following technical measures in order to solve the above-mentioned problems.

In the first aspect of the present invention, there is provided an exhaust adapter which is attached to a member having an exhaust port for combustion gas of a combustion apparatus having a burner and which is used for connecting an exhaust pipe to the exhaust port. The exhaust adapter comprises a pipe connection part for connecting a base part of the exhaust pipe with the base part rising vertically. The pipe connection part has an inner tubular wall and an outer tubular wall which rise vertically and are arranged in a concentric manner, a through hole communicating with the exhaust pipe is formed inside of the inner tubular wall, and an annular concave part with an upper part open and a lower part closed is formed between the inner tubular wall and the outer tubular wall. One of at least two types of exhaust pipes with different pipe diameters is capable of being selectively connected as the exhaust pipe by using either the through hole or the annular concave part. At least a part of the inner tubular wall is formed lower than the outer tubular wall, and drain generated from the combustion gas flows over the inner tubular wall and flows into the through hole and the exhaust port when drain flows into the annular concave part and the level of liquid increases, whereby drain is prevented from flowing over the outer tubular wall and from flowing outside.

Preferably, inner diameters of the inner tubular wall and the outer tubular wall correspond to outer diameters of the two types of the exhaust pipes, respectively and each inner circumferential surface of the inner tubular wall and the outer tubular wall is formed as surfaces for joining an outer circumferential surface of the exhaust pipe.

Preferably, each inner circumferential surface of the inner tubular wall and the outer tubular wall is formed as an inclined surface in such a manner that inner diameters of the inner tubular wall and the outer tubular wall reduce as extending downward, and a lower outer circumferential edge of the exhaust pipe butts the inclined surface when the exhaust pipe is fitted into either the through hole or the annular concave part, thereby positioning the exhaust pipe.

Preferably, at least one stopper projecting toward inside of the inner tubular wall is provided on the inner circumferential surface of the inner tubular wall lower than a predetermined butting position of the inner circumferential surface of the inner tubular wall and the lower outer circumferential edge of the exhaust pipe.

Preferably, an auxiliary part constituting a bottom of the annular concave part is provided on the outer circumferential surface of the inner tubular wall, a lower part of the inner tubular wall projects lower than the auxiliary part, and the pipe connection part is attachable to the member having the exhaust port in such a manner that the lower part of the inner tubular wall fits into the exhaust port.

Preferably, a concave part which is open downward for fitting an upper end of a tubular member constituting the exhaust port thereinto is formed between the lower part of the inner tubular wall and the lower part of the outer tubular wall.

Preferably, a flange is formed at a lower outer circumference of the outer tubular wall and has a plurality of apertures for inserting screws.

Preferably, the pipe connection part is made from resin.

In the second aspect of the present invention, there is provided a combustion apparatus comprising a burner, and an exhaust adapter which is attached to a member having an exhaust port for combustion gas generated by the burner and which is used for connecting a base part of an exhaust pipe with the base part rising vertically. The exhaust adapter comprises a pipe connection part for connecting the base part of the exhaust pipe with the base part rising vertically. The pipe connection part has an inner tubular wall and an outer tubular wall which rise vertically and are arranged in a concentric manner, and a through hole communicating with the exhaust port is formed inside of the inner tubular wall. An annular concave part with an upper part open and a lower part closed is formed between the inner tubular wall and the outer tubular wall. One of at least two types of exhaust pipes with different pipe diameters is capable of being selectively connected as the exhaust pipe when either the through hole or the annular concave part is used. At least a part of the inner tubular wall is formed lower than the outer tubular wall, and drain generated from the combustion gas flows over the inner tubular wall and flows into the through hole and the exhaust port when drain flows into the annular concave part and the level of liquid increases, thereby drain is prevented from flowing over the outer tubular wall and flowing outside.

Preferably, there is further provided a heat exchanger for heating water by recovering sensible heat and latent heat from the combustion gas, and the combustion apparatus is constituted as a water heater for recovering latent heat.

Preferably, the exhaust pipe is made from resin.

Other features and advantages of the present invention become more apparent from the description of the embodiments of the present invention given below with reference to the accompanying drawings.

DETAILED DESCRIPTION OF THE PREFERRED EMBODIMENTS

Preferred embodiments of the present invention are described below with reference to the accompanying drawings.

Figure 1:
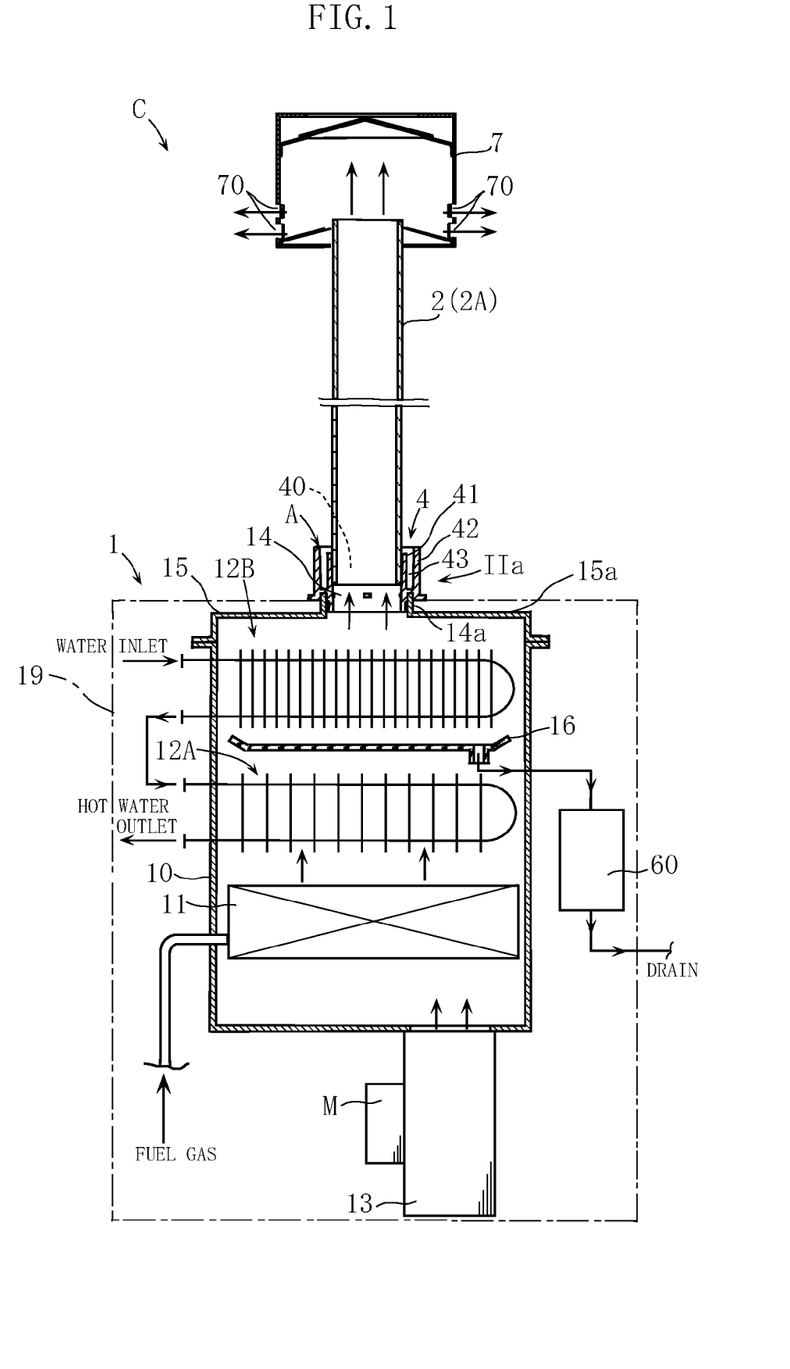
FIG. 1 is a schematic sectional view showing an example of a combustion apparatus of the present invention.

A combustion apparatus C shown in FIG. 1 is constituted as a water heating apparatus for recovering latent heat and is provided with a combustion apparatus main body 1, an exhaust adapter A, and an exhaust pipe 2.

The combustion apparatus main body 1 has a burner 11 housed in a case 10, a first heat exchanger 12A, a second heat exchanger 12B, an exhaust case 15 having an exhaust port 14, a fan 13 driven by a motor M, and an exterior case 19 surrounding them.

The burner 11 is, for example, a gas burner for burning fuel gas. The fan 13 supplies combustion air to the burner 11. The first and the second heat exchangers 12A, 12B recover sensible heat and latent heat from combustion gas generated by the burner 11, respectively and heat water, and water communicating therein is heated by the combustion gas and thereafter is supplied to a desirable place.

When latent heat is recovered from the combustion gas using the second heat exchanger 12B, highly acidic drain (condensate water) is generated. The drain runs down under the second heat exchanger 12B and is received in a drain pan 16. Then the drain flows into a neutralizer 60, is neutralized therein, and thereafter is discharged outside of the exterior case 19. The neutralizer 60 contains, for example, a neutralization agent such as calcium carbonate therein. The exhaust case 15 is attached on the upper part of the case 10 and leads the combustion gas passing through the second heat exchanger 12B to the exhaust port 14. The exhaust port 14 is constituted in such a manner that a tubular base part 14a in the form of upward cylinder is provided on a top panel 15a of the exhaust case 15 as apparently shown in FIG. 2A and FIG. 2B.

The exhaust adapter A is designed to selectively connect two types of exhaust pipes 2 (2A, 2B) with different pipe diameters to the exhaust port 14. The two exhaust pipes 2A, 2B are made from resin, such as polyvinyl chloride (PVC) or chlorinated polyvinyl chloride (CPUC). The exhaust adapter A is made of the same material as that of the exhaust pipes 2A, 2B. For example, the exhaust pipe 2A is a 3-inch pipe and the exhaust pipe 2B is a 4-inch pipe. The 3-inch pipe and the 4-inch pipe are formed so as to have inner diameter and outer diameter according to Sch40 or Sch80 of the American Standard. For example, according to Sch40, the inner diameter of the 3-inch pipe is 3 inches and the outer diameter thereof is 3.5 inches, and the inner diameter of the 4-inch pipe is 4 inches and the outer diameter thereof is 4.5 inches. The exhaust pipe 2A is shown in totally straight form in FIG. 1; however, apart around the middle of the exhaust pipe 2A can be bent as mentioned later. An exhaust top 7 is provided on the exhaust pipe 2A in order to prevent intrusion of rain and the like and the combustion gas passing through the exhaust pipe 2A is discharged outside from an exhaust port 70 of the exhaust top 7. The exhaust pipe 2B is similarly designed.

The exhaust adapter A has a pipe connection part 4 for connecting the base parts (lower parts) of the exhaust pipes 2A, 2B. The lower part of the pipe connection part 4 is designed to attach the exhaust adapter A to a member having the exhaust port 14. More specifically, the pipe connection part 4 has an inner tubular wall 41 in the form of cylinder, an outer tubular wall 42 in the form of cylinder surrounding the circumference of the inner tubular wall 41, and an auxiliary part 44 for connecting the lower part of the outer tubular wall 42 and a part around the middle of the inner tubular wall 41 in the height direction. The inside of the inner tubular wall 41 constitutes a through hole 40. An annular concavity 43 with an upper part open in the form of circle in plan view is formed between the inner tubular wall 41 and the outer tubular wall 42. The annular concavity 43 is bottomed (closed) with the auxiliary part 44 and functions as a part for fitting the exhaust pipe 2 thereinto.

Inner circumferential surfaces 41a, 42a of the inner tubular wall 41 and the outer tubular wall 42 are parts for joining the exhaust pipes 2A, 2B, respectively. Height H1 of the inner tubular wall 41 is designed to be lower than height H2 of the outer tubular wall 42. Such a configuration is useful for preventing drain from flowing over the upper end of the outer tubular wall 42 and from flowing outside of the exhaust adapter A, as mentioned later.

Figure 3A:
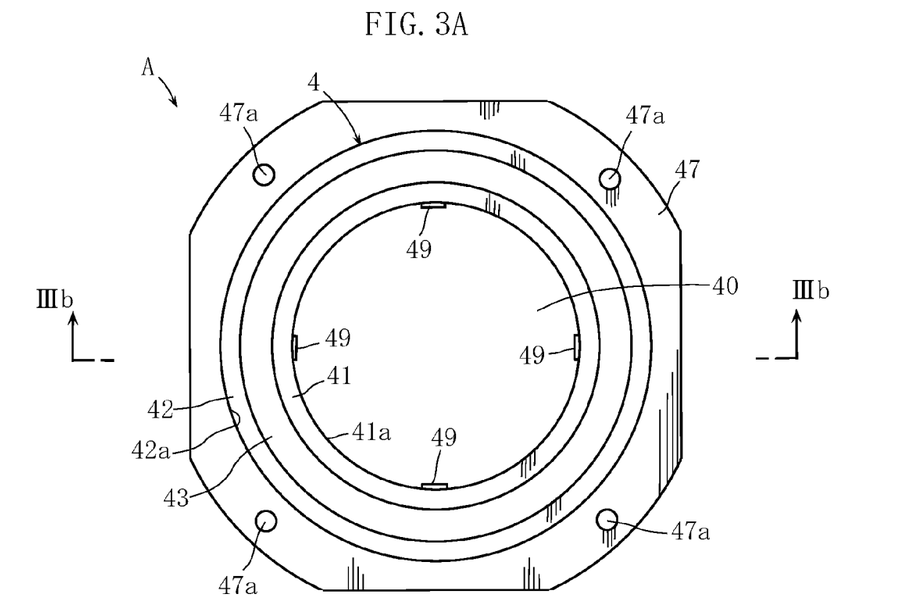
FIG. 3A is a plan view of the exhaust adapter used for the combustion apparatus shown in FIG. 1
Figure 3B:
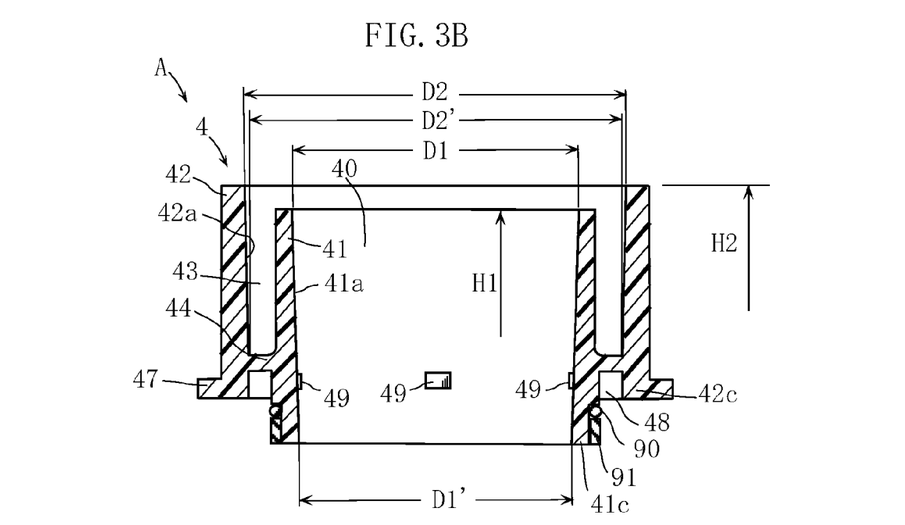
FIG. 3B is a sectional view taken along line IIIb-IIIb in FIG. 3A.

The inner diameters of the inner tubular wall 41 and the outer tubular wall 42 are sized in such a manner that the exhaust pipes 2A, 2B can be fitted into the inside of the tubular walls 41, 42 (the through hole 40 and the annular concavity 43) with minute gaps therebetween, respectively. In this case, the inner diameter D1 of the upper part of the inner tubular wall 41 is larger than the inner diameter D1' of the lower part thereof as shown in FIG. 3B and the substantially entire area of the inner circumferential surface 41a is an inclined surface in such a manner that the inner diameter of the inner tubular wall 41 gradually reduces in downward direction. Similarly, the inner diameter D2 of the upper part of the outer tubular wall 42 is larger than the inner diameter D2' of the lower part thereof and the substantially entire area of the outer circumferential surface 42a is an inclined surface in such a manner that the outer diameter of the outer tubular wall 42 gradually reduces in downward direction. In case that the outer diameter of the exhaust pipe 2A is Da and the outer diameter of the exhaust pipe 2B is Db, relations D1>Da>D1' and D2>Db>D2' are satisfied.

Figure 2A:
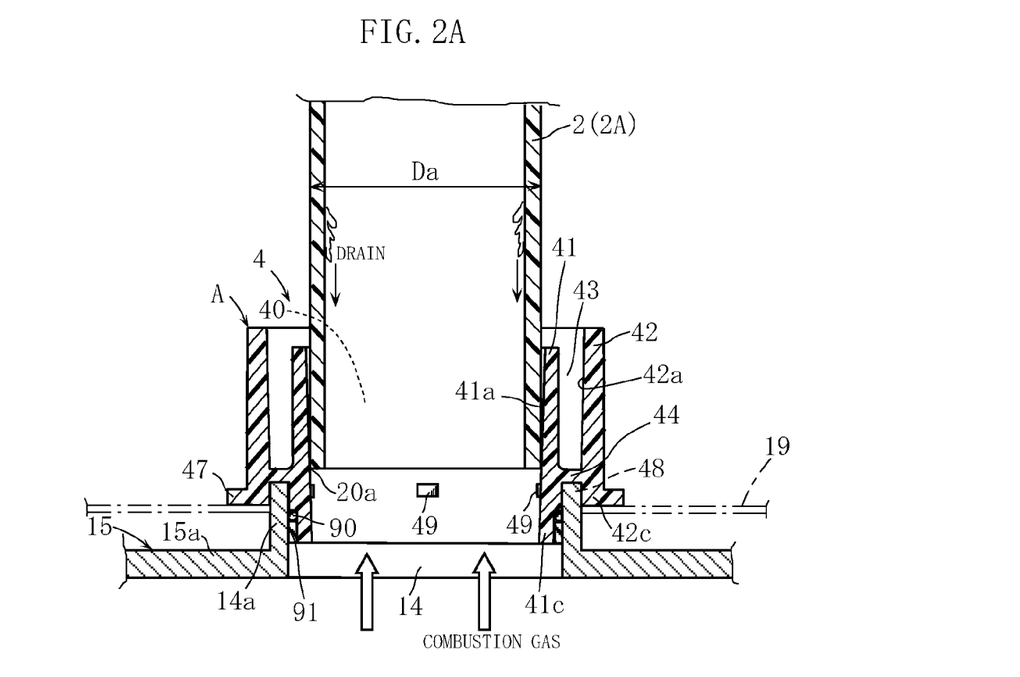
FIG. 2A is an enlarged sectional view of an essential part IIa in FIG. 1.

As shown in FIG. 2A, when the exhaust pipe 2A is fitted into the through hole 40 from the above, a lower outer circumferential edge 20a of the exhaust pipe 2A butts the inner circumferential surface 41a around the middle part of the inner tubular wall 41 along the height direction and the exhaust pipe 2A stops so as not to move down further. A convex stopper 49 is provided for the inner circumferential surface 41a and is positioned lower than a predetermined position where the exhaust pipe 2A stops. For example, if the exhaust pipe 2A is smaller than a desirable size, the lower outer circumferential edge may not come to butt the inner circumferential surface 41a. If such a case happens, the stopper 49 receives the lower end of the exhaust pipe 2A and helps positioning of the exhaust pipe 2A. The stopper 49 contributes security and high reliability when the exhaust pipe 2A is connected.

Figure 2B:
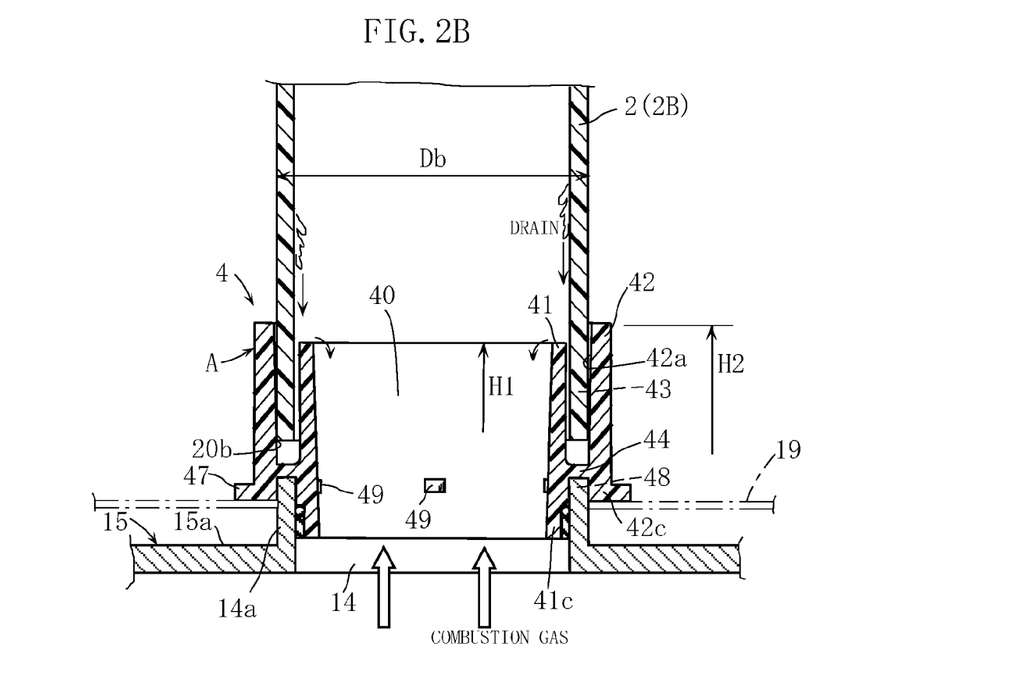
FIG. 2B is a sectional view of an essential part showing that an exhaust pipe different from the one in FIG. 2A is connected to the exhaust adapter.

As shown in FIG. 2B, when the exhaust pipe 2B is fitted into the annular concavity 43 from the above, a lower outer circumferential edge 20b of the exhaust pipe 2B butts the inner circumferential surface 42a above the bottom (auxiliary part 44) of the annular concavity 43, whereby the exhaust pipe 2B stops so as not to move down further. If the exhaust pipe 2B has smaller outer diameter than a desirable one, the auxiliary part 44 functions as a stopper for preventing the exhaust pipe 2B from moving down.

A lower part 41c of the inner tubular wall 41 is capable of fitting into the exhaust port 14 and functions as a part for attaching the exhaust adapter A to the tubular base part 14a of the exhaust port 14. An annular concavity 48 has an open lower part for fitting the upper end of the tubular base part 14a of the exhaust port 14 thereinto and is provided between the lower part 41c of the inner tubular wall 41 and a lower part 42c of the outer tubular part 42. Therefore, the exhaust adapter A can be easily positioned and safely attached to the member having the exhaust port 14.

An O-ring 90 made of an elastic material and an annular O-ring holder 91 are fitted onto the lower part 41c of the inner tubular wall 41 as shown in FIG. 3B. Such a configuration achieves airtight seal between the lower part 41c of the inner tubular wall 41 and the tubular base part 14a and prevents leakage of combustion gas.

A flange 47 is consecutively provided at the lower outer circumference of the outer tubular wall 42 and fixes the exhaust adapter A to the upper part of the exterior case 19. The flange 47 is provided with a plurality of apertures 47a for inserting screws so as to be fastened to the exterior case 19. When the flange 47 is fixed to the exterior case 19, the exhaust adapter A can be safely attached.

Next, functions of a combustion apparatus C having the exhaust adapter A are explained.

When the exhaust pipe 2A is used for the combustion apparatus C as shown in FIG. 2A, the exhaust pipe 2A is fitted into the through hole 40, thereby being connected to the exhaust adapter A. For connection, an adhesive agent or a similar solvent is applied in advance on the outer circumferential surface of the base part of the exhaust pipe 2A. This eliminates gap which causes leakage of combustion gas between the outer circumferential surface of the exhaust pipe 2A and the inner circumferential surface 41a of the inner tubular wall 41, thereby easily and strongly adhering the exhaust pipe 2A to the exhaust adapter A. The lower outer circumferential edge 20a of the exhaust pipe 2A can butt the inclined inner circumferential surface 41a of the inner tubular wall 41, thereby achieving superior seal performance of the butting part.

On the other hand, when the exhaust pipe 2B is used, it is fitted into the annular concavity 43, thereby being connected to the exhaust adapter A as shown in FIG. 2B. In case of connecting the exhaust pipe 2B, similar to the case of the exhaust pipe 2A, an adhesive agent or a similar solvent is applied in advance on the outer circumferential surface of the base part of the exhaust pipe 2B, whereby the outer circumferential surface of the exhaust pipe 2B and the inner circumferential surface 42a of the outer tubular wall 42 can be easily and strongly adhered. The lower outer circumferential edge of the exhaust pipe 2B butts the inclined inner circumferential surface 42a, thereby achieving superior seal performance of the butting part.

In the combustion apparatus C, even if either the exhaust pipe 2A or 2B is used as mentioned above, the exhaust pipe can be appropriately connected to the exhaust port 14 without exchanging the exhaust adapter A. The combustion apparatus C is designed to have necessary and enough exhaust flow rate when the exhaust pipe 2A is used under normal usage conditions. However, when the total length of the exhaust pipe 2 increases, it is preferable to use the exhaust pipe 2B in place of the exhaust pipe 2A in view of reducing exhaust resistance. Under such conditions, the combustion apparatus C is preferably applicable to both exhaust pipes 2A, 2B, thereby being convenient. The embodiment of the present invention does not require to prepare two types of exhaust adapters and to selectively use one of them.

As shown in FIG. 2B, when the exhaust pipe 2B is fitted into the annular concavity 43 and is connected to the exhaust adapter A, drain generated by reducing the temperature of combustion gas sometimes flows into the annular concavity 43 along the inner circumferential surface of the exhaust pipe 2B. When the liquid level of the drain thus flowing in the annular concavity 43 increases, the drain flows over the upper end of the inner tubular wall 41 and flows into the exhaust port 14. Therefore, the liquid level of drain does not reach the height H2 of the outer tubular wall 42. The exhaust pipe 2B and the outer tubular wall 42 can be adhered so as to be airtightly sealed as mentioned above; however, there is a possibility of causing gap therebetween because of operation error and unforeseen circumstances. Even in such circumstances, the drain in the annular concavity 43 flows over the inner tubular wall 41 and flows into the exhaust port 14, so that it does not flow over the upper end of the outer tubular wall 42, whereby drain does not flow out of the exhaust adapter A. If acid drain flows outside, the upper part of the external case 19 is contaminated. However, the combustion apparatus C can appropriately avoid such defects.

The drain flowing into the exhaust port 14 is received in the drain pan 16 and then is fed to the neutralizer 60 like the drain generated in the second heat exchanger 12B. Then the drain is discharged outside after being neutralized. Therefore, there is no problem when the drain in the annular concavity 43 is positively flown to the exhaust port 14. As shown in FIG. 2A, when the exhaust pipe 2A is fitted into the through hole 40, the drain generated in the exhaust pipe 2A flows down the exhaust port 14 along the inner circumferential surface of the exhaust pipe 2A and is received in the drain pan 16.

The exhaust adapter A and the exhaust pipe 2 are made from resin, so that they can be easily manufactured using a mold and cost reduction and weight saving can be stimulated. The combustion gas passing through the exhaust adapter A and the exhaust pipe 2 is combustion gas with comparatively low temperature after recovering latent heat, thereby avoiding such a problem that the exhaust adapter A and the exhaust pipe 2 are thermally damaged.

FIG. 4 to FIG. 8 show another embodiment of the preset invention, respectively. In these figures, the elements which are identical or similar to those of the above-mentioned embodiment are designated by the same reference signs as those used for the above-mentioned embodiment.

Figure 4:
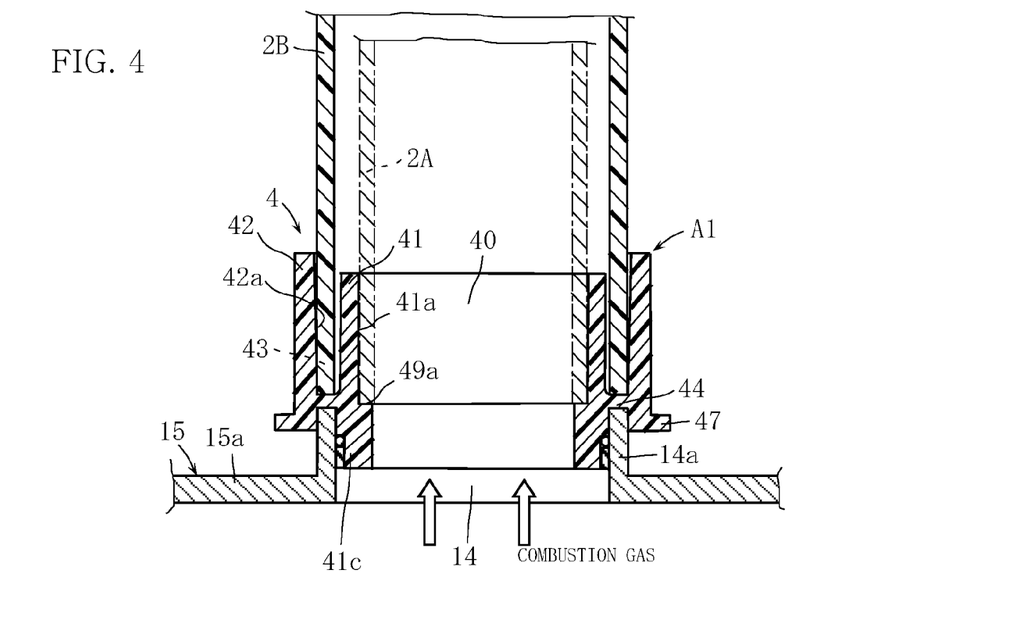
FIG. 4 is a sectional view of an essential part showing another example of the present invention.

In an exhaust adapter A1 in FIG. 4, the inner circumferential surfaces 41a, 42a of the inner tubular wall 41 and the outer tubular wall 42 are not designed to be inclined surfaces. The inner circumferential surface 41 is formed with a stepped part 49a functioning as a stopper for receiving the lower end of the exhaust pipe 2A. The auxiliary part 44 functions as a stopper for receiving the lower end of the exhaust pipe 2B. This embodiment is different from the above-mentioned embodiment in that the lower outer circumferential edges of the exhaust pipes 2A, 2B cannot butt the inner circumferential surfaces 41a, 42a, respectively; however, the lower ends of the exhaust pipes 2A, 2B butt the stepped part 49a and the auxiliary part 44, respectively, so that the exhaust pipes 2A, 2B can be appropriately positioned in the vertical direction.

Figure 5:
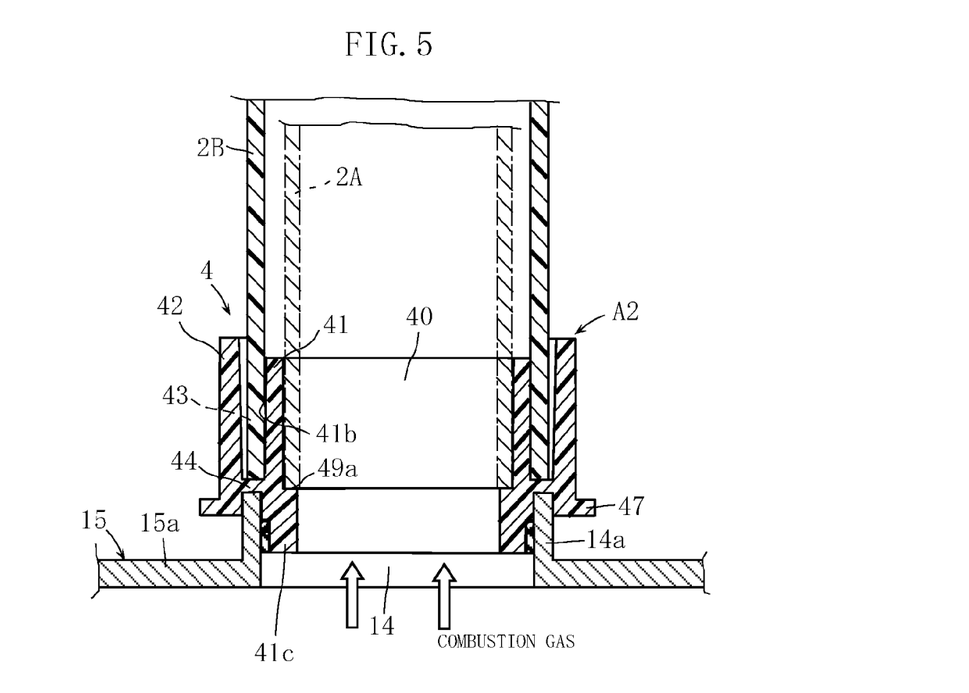
FIG. 5 is a sectional view of an essential part showing another example of the present invention.

In an exhaust adapter A2 in FIG. 5, the outer diameter of the inner tubular wall 41 is designed to be a little smaller than the inner diameter of the exhaust pipe 2B and the outer circumferential surface 41b of the inner tubular wall 41 constitutes a surface for joining the inner circumferential surface of the exhaust pipe 2B. When the exhaust pipe 2B is fitted into the annular concavity 43 like this embodiment, the exhaust pipe 2B can be constituted so as to be joined with the inner tubular wall 41 in place of the outer tubular wall 42.

Figure 6:
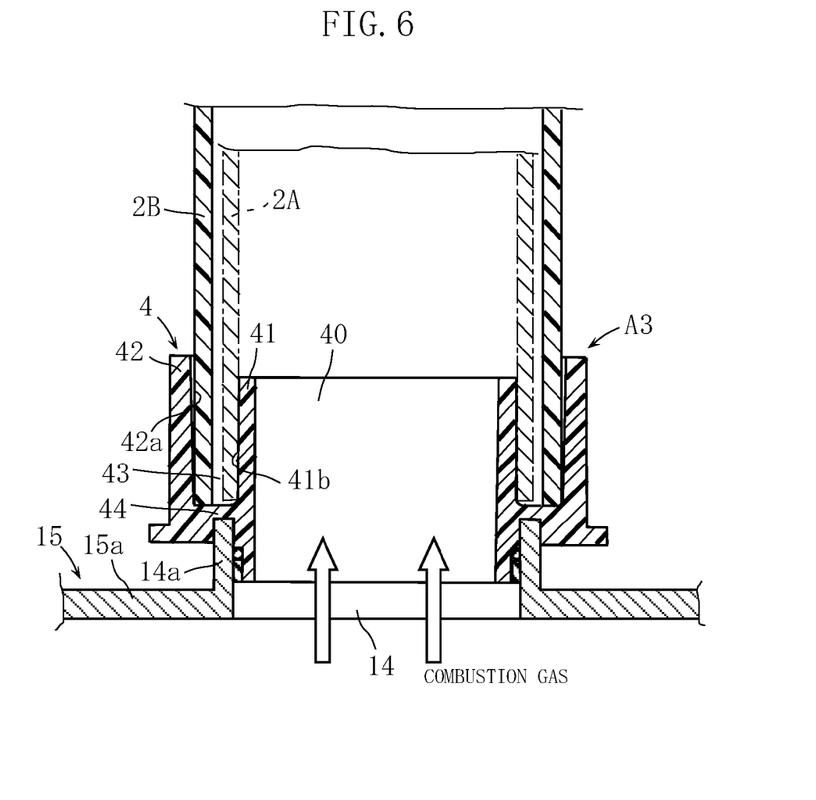
FIG. 6 is a sectional view of an essential part showing another example of the present invention.

In an exhaust adapter A3 in FIG. 6, both of the exhaust pipes 2A, 2B are designed to be capable of fitting into the annular concavity 43. More specifically, the outer circumferential surface 41b of the inner tubular wall 41 is constituted as a surface for joining the inner circumferential surface of the exhaust pipe 2A and the inner circumferential surface 42a of the outer tubular wall 42 is constituted as a surface for joining the outer circumferential surface of the exhaust pipe 2B. In such a configuration, the exhaust pipe 2A can be designed so as not to be fitted into the exhaust port 14.

Figure 7:
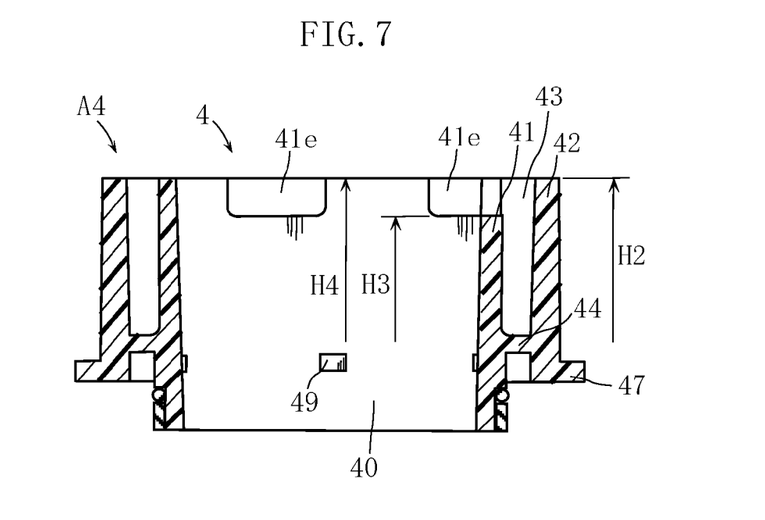
FIG. 7 is a sectional view of an essential part showing another example of the present invention.

In an exhaust adapter A4 in FIG. 7, a cutout part 41e is designed to be formed on the upper end of the inner tubular wall 41. Height H4 of the inner tubular wall 41 where the cutout 41e is not provided is substantially the same as the height H2 of the outer tubular wall 42, in which height H3 thereof where the cutout 41e is provided is lower than the height H2 of the outer tubular wall 42. In such a configuration, when the liquid level of the drain flowing in the annular concavity 43 increases, the drain flows over the upper end of the cutout 41e of the inner tubular wall 41 and flows into the exhaust port 14. Therefore, there is no fear that the drain flows over the upper end of the outer tubular wall 42 and flows outside. As understood from the embodiment, only a part of the inner tubular wall 41 can be designed to be lower than the outer tubular wall 42.

Figure 8:
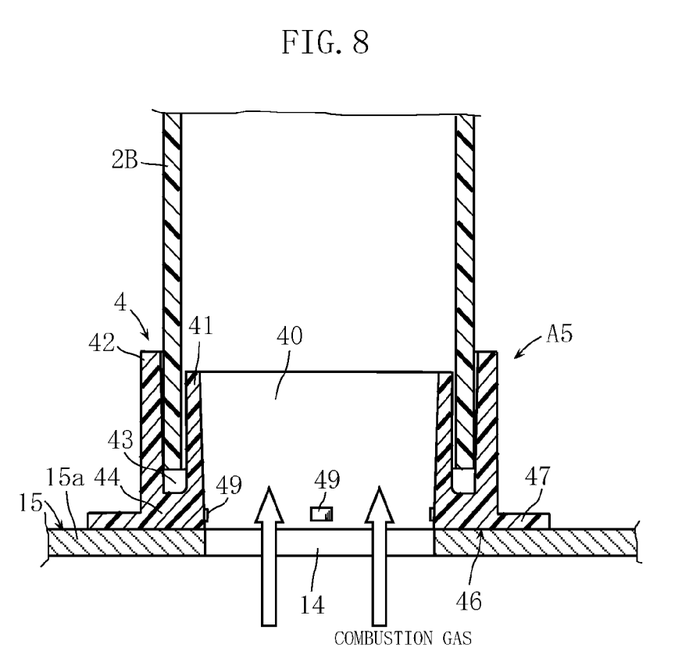
FIG. 8 is a sectional view of an essential part showing another example of the present invention.

A lower part 46 of an exhaust adapter A5 in FIG. 8 is designed to be attachable to the exhaust case 15 in such a manner that the lower part 46 butts a substantially planer upper surface of the exhaust case 15. Such a configuration can appropriately deal with the case when the tubular base part 14a is not provided around the exhaust port 14.

The present invention is not limited to the above-mentioned embodiments. Specific structures of the members of the exhaust adapter and the combustion apparatus of the present invention can be varied in design in several ways within the scope of the present invention.

The exhaust adapter of the present invention can be designed such that another exhaust pipe (not shown) having smaller inner diameter than those of the exhaust pipes 2A, 2B is fitted into the through hole 40 in the structure wherein two types of exhaust pipes 2A, 2B are capable of fitting into the annular concavity 43 as shown in the embodiment in FIG. 6 and three types of exhaust pipes are connected. Furthermore, an additional outer tubular wall higher than the outer tubular wall can be provided outside of the inner tubular wall and the outer tubular wall, so that three or more types of exhaust pipes can be connected. Even when such an additional outer tubular wall is provided, the embodiment is within the technical scope of the present invention as long as the inner tubular wall and the outer tubular wall which are intended in the present invention are provided.

When the exhaust pipe is connected to the exhaust adapter, the entire area of the exhaust pipe in the longitudinal direction is not required to vertically rise. At least a base part of the exhaust pipe is required to vertically rise. For example, even when a part around the middle of the exhaust pipe in the longitudinal direction bends in the horizontal direction, the present invention is applicable. The exhaust pipe to be connected is not limited to the 3-inch pipe and the 4-inch pipe as mentioned above and exhaust pipes of various types and sizes other than them can be applicable. The exhaust pipe can be made of metal other than resin. The exhaust adapter can be made of other material than resin. The combustion apparatus of the present invention is not limited to a water heating apparatus such as a water heater and can be constituted, for example, as a combustion apparatus for incinerating waste, or a combustion apparatus as a furnace for an intended article or material. Specific use of the combustion apparatus is not limited. The burner can be, for example, an oil burner for burning fuel oil in place of a gas burner.

The invention claimed is:

1. An exhaust adapter which is attached to a member having an exhaust port for combustion gas of a combustion apparatus having a burner and which is used for connecting an exhaust pipe to the exhaust port, the exhaust adapter comprising:

a pipe connection part for connecting a base part of the exhaust pipe with the base part rising vertically;

wherein the pipe connection part has an inner tubular wall and an outer tubular wall which rise vertically and are arranged in a concentric manner, a through hole communicating with the exhaust port is formed inside of the inner tubular wall, and an annular concave part with an upper part open and a lower part closed is formed between the inner tubular wall and the outer tubular wall;

wherein one of at least two types of exhaust pipes with different pipe diameters is capable of being selectively connected as the exhaust pipe by using either the through hole or the annular concave part; and wherein at least a part of the inner tubular wall is formed lower than the outer tubular wall, and drain generated from the combustion gas flows over the inner tubular wall and flows into the through hole and the exhaust port when drain flows into the annular concave part and the level of liquid increases, whereby drain is prevented from flowing over the outer tubular wall and from flowing outside.

2. The exhaust adapter according to claim 1, wherein inner diameters of the inner tubular wall and the outer tubular wall correspond to outer diameters of the two types of the exhaust pipes, respectively and each inner circumferential surface of the inner tubular wall and the outer tubular wall is formed as surfaces for joining an outer circumferential surface of the exhaust pipe.

3. The exhaust adapter according to claim 2,
wherein each inner circumferential surface of the inner tubular wall and the outer tubular wall is formed as an inclined surface in such a manner that inner diameters of the inner tubular wall and the outer tubular wall reduce as extending downward, and
wherein a lower outer circumferential edge part of the exhaust pipe butts the inclined surface when the exhaust pipe is fitted into either the through hole or the annular concave part, thereby positioning the exhaust pipe.

4. The exhaust adapter according to claim 3, wherein at least one stopper projecting toward inside of the inner tubular wall is provided on the inner circumferential surface of the inner tubular wall lower than a predetermined butting position of the inner circumferential surface of the inner tubular wall and the lower outer circumferential edge part of the exhaust pipe.

5. The exhaust adapter according to claim 1, wherein an auxiliary part constituting a bottom of the annular concave part is provided on the outer circumferential surface of the inner tubular wall, a lower part of the inner tubular wall projects lower than the auxiliary part, and the pipe connection part is attachable to the member having the exhaust port in such a manner that the lower part of the inner tubular wall fits into the exhaust port.

6. The exhaust adapter according to claim 5, wherein a concave part which is open downward for fitting an upper end of a tubular member constituting the exhaust port thereinto is formed between the lower part of the inner tubular wall and the lower part of the outer tubular wall.

7. The exhaust adapter according to claim 1, wherein a flange is formed at a lower outer circumference of the outer tubular wall and has a plurality of apertures for inserting screws.

8. The exhaust adapter according to claim 1, wherein the pipe connection part is made from resin.

9. A combustion apparatus comprising:
a burner; and
an exhaust adapter which is attached to a member having an exhaust port for combustion gas generated by the burner and which is used for connecting a base part of an exhaust pipe with the base part rising vertically,
wherein the exhaust adapter comprises a pipe connection part for connecting the base part of the exhaust pipe with the base part rising vertically;
wherein the pipe connection part has an inner tubular wall and an outer tubular wall which rise vertically and are arranged in a concentric manner, a through hole communicating with the exhaust port is formed inside of the inner tubular wall, and an annular concave part with an upper part open and a lower part closed is formed between the inner tubular wall and the outer tubular wall;
wherein one of at least two types of exhaust pipes with different pipe diameters is capable of being selectively connected as the exhaust pipe when either the through hole or the annular concave part is used; and
wherein at least a part of the inner tubular wall is formed lower than the outer tubular wall, drain generated from the combustion gas flows over the inner tubular wall and flows into the through hole and the exhaust port when drain flows into the annular concave part and the level of liquid increases, whereby drain is prevented from flowing over the outer tubular wall and from flowing outside.

10. The combustion apparatus according to claim 9, further comprising a heat exchanger for heating water by recovering sensible heat and latent heat from the combustion gas, wherein the combustion apparatus is constituted as a water heater for recovering latent heat.

11. The combustion apparatus according to claim 9, wherein the exhaust pipe is made from resin.

* * * * *